(12) United States Patent
Collins et al.

(10) Patent No.: US 6,239,740 B1
(45) Date of Patent: May 29, 2001

(54) EFFICIENT DATA ASSOCIATION WITH MULTIVARIATE GAUSSIAN DISTRIBUTED STATES

(75) Inventors: Joseph B. Collins, Washington, DC (US); Jeffrey K. Uhlmann, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/076,922

(22) Filed: Jun. 15, 1993

Related U.S. Application Data

(63) Continuation of application No. 07/684,730, filed on Apr. 15, 1991, now abandoned.

(51) Int. Cl.[7] .............................. G01S 13/00; G01S 13/53

(52) U.S. Cl. .............................. 342/109; 342/99; 342/62; 342/96; 706/905

(58) Field of Search .................................. 395/1, 22, 425, 395/905; 701/222; 342/109, 96, 99, 62

(56) References Cited

U.S. PATENT DOCUMENTS 5,424,742 * 6/1995 Long et al. .............................. 342/75

* cited by examiner

Primary Examiner—George B. Davis
(74) Attorney, Agent, or Firm—Thomas E. McDonnell; Edward Miles

(57) ABSTRACT

We describe an efficient algorithm for evaluating the (weighted bipartite graph of) associations between two sets of data with gaussian error, e.g., between a set of measured state vectors and a set of estimated state vectors. First a general method is developed for determining, from the covariance matrix, minimal d-dimensional error ellipsoids for the state vectors which always overlap when a gating criterion is satisfied. Circumscribing boxes, or d-ranges, for the data ellipsoids are then found and whenever they overlap the association probability is computed. For efficiently determining the intersections of the d-ranges a multidimensional search tree method is used to reduce the overall scaling of the evaluation of associations. Very few associations that lie outside the predetermined error threshold or gate are evaluated. Empirical testing for variously distributed data in both three and eight dimensions indicate that the scaling is significantly reduced from $N^2$, where N is the size of the data set. Computational loads for many large scale (N>10–100) data association tasks may therefore be significantly reduced by this or related methods.

11 Claims, 1 Drawing Sheet

EFFICIENT DATA ASSOCIATION WITH MULTIVARIATE GAUSSIAN DISTRIBUTED STATES

This application is a continuation of application Ser. No. 07/684,730 filed Apr. 15, 1991, now abandoned.

FIELD OF THE INVENTION

The invention pertains generally to tracking of objects, such as aircraft by radar or submarines by sonar, and particularly to computationally efficient apparatus and methods of tracking and data fusion.

BACKGROUND OF THE INVENTION

As demand for practical solutions to larger scale data fusion or data association tasks increases, issues of computational complexity of the algorithmic approaches used become topics of more serious interest. Theoretically well-defined and well-grounded analytical models for data association problems may exist without having easily computed solutions. When such situations arise it is desirable to determine efficient approximation procedures that, if possible, are well-conditioned such that certain bounds on errors can be determined.

When data association tasks consist of merging, or fusing, two or more large sets of data that both represent a common underlying reality or ground truth, such issues of the computational complexity of the algorithms do arise. We assume that a general task of data association is to take two independent sets of state estimates, e.g., measurements and predicted state values, that each represent a common underlying set of objects and to determine the associations between the elements from the distinct sets of data. Fusion, or subsequent assignment of the elements from the independent representations to a single representation will depend on the determination of these associations.

Typically in discussions of computational complexity, reference is made to the underlying graph theoretic structure of the problem at hand. The purpose of this exercise is to determine if the general problem has ever arisen in other applications. In fact, this is indeed the case with some data association problems. The graph structure associated with the fusion problem is a bipartite graph, since by assumption there are two sets of data, independently arrived at. From each element $a \in A$ there may be an association with an element $b \in B$ represented by an edge $\omega_{ab} \in E$. On the graph, $\Gamma\{A, B, E\}$ this corresponds to vertices of A connected to vertices of B with weighted edges, where the weight represents the weight of association. One may think of the association weights forming an association matrix, $\Omega$. In the process of fusion there are commonly constraints that describe feasible joint events, i.e., each element of one set may be assigned to at most only one element of the other set and vice-versa. In such cases the joint event is properly termed a match or, defined on a bipartite graph, a bipartite match. If this match has maximum cardinality, generally corresponding to the constraint that a feasible joint event is a one-to-one mapping (always possible with false alarms), then it is called a perfect match.

In general the representation of objects is a multidimensional state value with an associated error estimate. Commonly the state value is an estimated mean value and the error is represented as an associated covariance matrix defining a Gaussian probability distribution. When a probabilistic interpretation is given to the association weights, as we have assumed, the merging may be done in a variety of ways that have particular probabalistic interpretations. The nearest-neighbor approach, where the largest association weight at each node of one set alone determines the assignment, essentially assumes that there is virtually only one individual pairwise association of importance for every element, a condition of sparsity of the association matrix, $\Omega$. The nearest-neighbor approach is the simplest of greedy heuristics. The optimum weighted bipartite match corresponds to the most probable, or modal, joint event, and is also used as a fusion method.

In dense environments where individual elements appear to have many significant associations, a more appropriate approach to this data association problem is described by Bar-Shalom (Tracking and Data Association, ACADEMIC PRESS (1968)) and is referred to as JPDA (joint probabilistic data association). In this approach each association weight is taken as an individual pairwise association probability or marginal association probability. The relative probability of one match with respect to any other is taken as the product of the individual pairwise association probabilities (the edge weights) of the match. (Since objective functions are usually summed, this corresponds to the sum over the log of the pairwise association probabilities). The expected probability that a and b refer to the same object is determined by summing the joint probabilities of the perfect matches in which a and b are paired and normalizing by the sum of joint probabilities over all possible perfect matches. For an N×N association matrix, $\Omega$, this may be alternatively stated as $$<p_{ab}> = \Omega_{ij} * \text{perM}_{(i,j)} / \text{per}\Omega \qquad (1)$$

where the permanent of $\Omega$ is defined as $$\text{per}\Omega = \sum_{i_1, i_2, \ldots, i_N} |\epsilon_{i_1, i_2, \ldots, i_N}| \Omega_{i_1,1} \Omega_{i_2,2} \ldots \Omega_{i_N,N} \qquad (2)$$

$$= \sum_{\sigma} \Omega_{\sigma_1,1} \Omega_{\sigma_2,2} \ldots \Omega_{\sigma_N,N}$$

which is similar to the definition of the determinant with the exception that the absolute value of the Levi-Civita symbol is used to represent the sum over all permutations, $\sigma$, of the indices $1 \ldots N$, and the permanent—minor, or $\text{perM}_{(i,j)}$, is determined by taking the permanent of the matrix $M_{(i,j)}$, generated by crossing out the ith row and jth column of the matrix $\Omega$.

Valiant (The Complexity of Computing the Permanent, THEORETICAL COMPUTER SCIENCE, 8, 189–201 (1979)) has shown that the evaluation of the permanent of a 0–1 matrix (similar to the validation matrix for JPDA), equivalent to counting the number of perfect matches, is NP-hard. Complete evaluation of the permanent of a general association matrix is equivalent to enumeration of all possible perfect matches, a significantly more difficult problem. This implies that the exact solution of the JPDA is indeed NP-hard. Approximation methods, however, do exist and generally reduce the computational scaling significantly. These methods themselves then become the important subjects of consideration in terms of computational scaling.

Determining computational tractability in approaches to tracking for large-scale real-time problems is an exercise of putting practical upper bounds on algorithmic scaling. Clearly, any algorithm will scale at least linearly with the size of the input data. We would maintain, perhaps arbitrarily, that for large-scale problems quadratic algorithmic scaling forms a practical upper bound.

Thresholding the elements of $\Omega$ is one approach that reduces the scaling of JPDA (or any other approach). The permanent may be evaluated recursively via a development through permanent-minors in the same manner as a determinant is evaluated by a Laplacian development through minors. For sparse matrices with O(kN) elements this evaluation method appears to scale at worst as $N^k$. Clearly, by thresholding matrix elements to guarantee sparsity, one may both approximate the permanent and put a limit on the scaling behavior of the evaluation algorithm.

Gating is the general problem in data fusion of determining significant association probabilities between two large sets of linear, multidimensional pattern elements (see S. S. Bleckman, Multi-Target Tracking with Radar Applications (Artech House 1986)), e.g., thresholding the association probability overlap integrals between a set of measured state vectors and a set of of estimated state vectors, both having associated error distributions. As a precursorial coarse assignment method for multitarget tracking, it reduces the computational complexity of the NP-hard exact JPDA, or any other data association method.

Computing the full association matrix between two large data sets of size N scales as $N^2$ in time. Also, computing the association probability overlap integral between two errored vectors is generally a computationally expensive procedure. For sparse systems, those where there are only order N significant associations, where significance is determined by a "gate ", this becomes a problem since a lot of work is performed relative to the significant pieces of information garnered. Two outstanding problems are determining a good or optimally scaling association algorithm and a method of evaluation that computes a minimum number of associations that are likely to satisfy the gating criterion. Solution of these problems contributes important computational labor savings to many data association tasks.

An association probability is essentially the probability overlap integral between two (distributed) states. Significant associations exist, roughly speaking, for near-neighbors in state space. If a probability distribution for a state is not local, e.g., cannot be bounded to a small, connected and convex volume of the state space, then it will generally be necessary to evaluate a large number of overlap integrals and consideration of efficiently scaling algorithms may not be worthwhile. On the other hand, if the probability distributions do have these geometric properties, then preprocessing of the distributed states and the application of an efficiently scaling multidimensional search tree algorithm can significantly improve gating efficiency.

In order to eliminate the need to individually consider every pairwise association it is necessary to determine if the thresholding imposed by the gating criterion on the pairwise associations of errored vectors induces or can be decomposed to a thresholding criterion on the individual distributed states themselves. If a thresholding criteria can be so determined so as to define finite volumes in state space for each state, then the existence of a significant association implies the geometric intersection of these volumes (or at least we can so define the induced thresholding criterion). The determination of the intersections of finite geometric objects can be done efficiently by the use of data structures known as multidimensional search trees (see Valiant and Blackman, supra).

SUMMARY OF THE INVENTION

Accordingly, an object of the invention is to track a plurality of objects, or fuse a plurality of data sets, in a computationally efficient manner.

Another object is to track a plurality of N objects, or fuse a plurality of data sets of N members, in a manner which requires a number of computations significantly less than $N^2$.

In accordance with these and other objects made apparent hereinafter, the invention pertains to a method and apparatus of correlating a plurality of objects. At two different times, sets of d dimensional data vectors $\{\alpha\}$ and $\{\beta\}$ are produced, each of whose elements $a \in \{\alpha\}$ and $b \in \{\beta\}$ corresponds to one of the plurality of objects. The uncertainty of each element of each said data vector a or b is taken to be Gaussian, and thus has respective covariance matrices A and B. A numerical value $\gamma_{AB}$ is selected, which is used to determine which vector pairs a, b satisfy the gating criterion: $\gamma_A \geq \gamma_{AB}$, and $\gamma_B \geq \gamma_{AB}$, where $$\gamma_A = (r-a)^T A^{-1}(r-a)$$

$$\gamma_B = (r-b)^T B^{-1}(r-b)$$

$$\gamma_{AB} = (a-b)^T (A+B)^{-1}(a-b)$$

and where r is some d dimensional vector. A relatedness criterion is selected for characterizing the degree of association between any such vector pair a,b, and the relatedness criterion applied to all vector pairs which satisfy the gating criterion. Finally, one uses these results to fuse the data vectors of sets $\{\alpha\}$ and $\{\beta\}$ into a fused set $\{c\}$ of data vectors each of whose members corresponds to one of the objects. Because the gating criterion eliminated data pairs having small likelihood of correlation, the relatedness criterion need be applied only to those pairs not eliminated by the gating criterion, reducing the number of calculations necessary to correlate $\{\alpha\}$ and $\{\beta\}$.

The invention is more fully understood from the following detailed description of preferred embodiments, presented in conjunction with the appended drawings, wherein:

DETAILED DESCRIPTION

Figure 1:
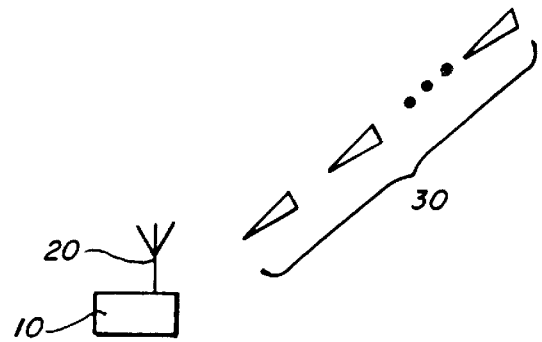
FIG. 1 is a schematic drawing illustrating a scenario for practicing the invention.

An outline of the gating procedure required to implement an efficient search is as follows. A standard deviation threshold, or gate size, is chosen which each associated pair must satisfy. This induces a standard deviation thresholding for the independent elements, i.e., for each of the measured states and the estimated states. The resulting volume representing each errored vector is described by an ellipsoid in d-dimensional space. Detailed below is a justification showing that when the probability of association satisfies the gating criterion then the two ellipsoids of the associated data elements overlap. This is done by determining the thresholding criterion on each of the data element distributions that is induced by the gating criterion and that has this property. In fact, we show that the geometric property we seek turns out to be a consequence of a geometric inequality.

We begin by defining a distributed state as a probability distribution which for multivariate normal distributions with a Euclidean distance measure can be represented as the pairing of a mean state vector and a covariance matrix. For example an estimated distributed state, $A = \{a, A\}$, has an estimated mean state a and a covariance matrix A; a measured distributed state, $B = \{b, B\}$, has a measured state b and a covariance matrix B. Their probability distributions in d-dimensional state space, r, are $$\rho_A(r) = \frac{e^{-\frac{1}{2}(r-a)^T A^{-1}(r-a)}}{\sqrt{(2\pi)^d |A|}} \quad \text{and} \quad \rho_B(r) = \frac{e^{-\frac{1}{2}(r-b)^T B^{-1}(r-b)}}{\sqrt{(2\pi)^d |B|}} \quad (3)$$

respectively, where A and B are positive definite and symmetric.

The probability of association between the two object representations is proportional to the overlap integral $$\rho_{AB} = \int \frac{e^{-\frac{1}{2}(r-a)^T A^{-1}(r-a)}}{\sqrt{(2\pi)^d |A|}} * \frac{e^{-\frac{1}{2}(r-b)^T B^{-1}(r-b)}}{\sqrt{(2\pi)^d |B|}} d^d r \quad (4)$$

which, when integrated over state space reduces to $$\rho_{AB} = \frac{e^{-\frac{1}{2}(a-b)^T (A+B)^{-1}(a-b)}}{\sqrt{(2\pi)^d |A+B|}} \quad (5)$$

The probability of association, $\rho_{AB}$, represents the distribution of measured states in the estimated-state state space (or vice-versa). For a given object, the corresponding probability that b will lie within the ellipsoidal surface $$E_{AB}|(a-b')^T(A+B)^{-1}(a-b')=\gamma_{AB} \quad (6)$$

with probability, or rate, of correct associations $$p_{AB} = \int^{E_{AB}} \frac{e^{-\frac{1}{2}(a-b)^T(A+B)^{-1}(a-b)}}{\sqrt{(2\pi)^d |A+B|}} d^d a. \quad (7)$$

The gate is determined by choosing a threshold $\gamma_{AB}$ or a probability threshold $p_{AB}$ which are related by $$p_{AB} = \text{err}(\sqrt{\gamma_{AB}}, d). \quad (8)$$

where we define $$\text{err}(x, d) = \frac{\int_0^x t^{d-1} e^{-\frac{t^2}{2}} dt}{\int_0^\infty t^{d-1} e^{-\frac{t^2}{2}} dt}. \quad (9)$$

Ellipsoidal surfaces, $E_A$ for the estimated position and $E_B$ for a measurement of the position, may also be defined by $\gamma_A$ and $\gamma_B$ like, $$E_A|(r'-a)^T A^{-1}(r'-a)=\gamma_A \quad (10)$$

and $$E_B|(r''-b)^T B^{-1}(r''-b)=\gamma_B \quad (11)$$

within which the actual object represented may be expected to lie with probabilities $$p_A = \int^{E_A} \rho_A(r) d^d r \quad (12)$$

$$= \int^{E_A} \frac{e^{-\frac{1}{2}(r-a)^T A^{-1}(r-a)}}{\sqrt{(2\pi)^d |A|}} d^d r$$

$$= \text{err}(\sqrt{\gamma_A}, d).$$

and $$p_B = \int^{E_B} \rho_B(r) d^d r \quad (13)$$

$$= \int^{E_B} \frac{e^{-\frac{1}{2}(r-b)^T B^{-1}(r-b)}}{\sqrt{(2\pi)^d |B|}} d^d r$$

$$= \text{err}(\sqrt{\gamma_B}, d).$$

respectively.

To determine $\gamma_A$ and $\gamma_B$ such that when the gate is satisfied ellipsoids $E_A$ and $E_B$ overlap, we note that each must be at least greater than or equal to $\gamma_{AB}$ since as one distribution, say $\rho_A$, tends to a Dirac $\delta$-function then the gating criterion will only be satisfied if a falls within ellipse $E_B$, or $$(a-b)^T B^{-1}(a-b) \leq \gamma_{AB} \quad (14)$$

and vice-versa if $\rho_B$ tends to a Dirac $\delta$-function. In other words $\gamma_A \geq \gamma_{AB}$ and $\gamma_B \geq \gamma_{AB}$ are necessary conditions to guarantee overlap.

Now we show that $\gamma_A = \gamma_B = \gamma_{AB}$ is a sufficient condition such that when the gate is satisfied ellipsoids $E_A$ and $E_B$ overlap.

The gating condition $$(a-b)^T (A+B)^{-1}(a-b) \leq \gamma_{AB} \quad (15)$$

can be interpreted to mean that a lies within ellipsoid $E_{AB}$ centered around b. A hyperplane tangent to the ellipsoid along any particular coordinate direction i (for any coordinate frame) is a distance $\sqrt{\gamma_{AB}(A+B)_{ii}}$ from the center (a simple proof is detailed in Appendix I). Since a lies within the ellipsoid $E_{AB}$, the projection of (a−b) along the same coordinate direction satisfies $$(a-b)_i \leq \sqrt{\gamma_{AB}(A+B)_{ii}} \quad (16)$$

Because the diagonal elements of the matrices A and B are positive definite, we also know that $$\sqrt{\gamma_{AB}(A+B)_{ii}} \leq \sqrt{\gamma_{AB} A_{ii}} + \sqrt{\gamma_{AB} B_{ii}} \quad (17)$$

which gives rise to the result $$(a-b)_i \leq \sqrt{\gamma_{AB} A_{ii}} + \sqrt{\gamma_{AB} B_{ii}}. \quad (18)$$

This result implies that all projections of the ellipsoids $E_A$ and $E_B$, centered at a and b respectively, overlap. This can only be true if the ellipsoids $E_A$ and $E_B$ themselves overlap.

There is another way to understand this result. At a point $r_m$ the function $$f(r) = (r-a)^T A^{-1}(r-a) + (r-b)^T B^{-1}(r-b) \quad (19)$$

has a minimum value that is exactly $f(r_m) = (a-b)^T (A+B)^{-1}(a-b)$.

This allows the expression for all r $$(a-b)^T (A+B)^{-1}(a-b) \leq (r-a)^T A^{-1}(r-a) + (r-b)_T B^{-1}(r-b) \quad (20)$$

which reflects an essential geometric property of the space of Gaussian-distributed, independent random variables. From this result follows the interpretation that at this point, $r_m$, both $$(r-a)^T A^{-1}(r-a) \leq f(r_m) \text{ and } (r-b)^T B^{-1}(r-b) \leq f(r_m) \quad (21)$$

are true, i.e., the ellipses $E_A$ and $E_B$ overlap.

This proves the sufficiency condition that was sought; we therefore find that $\gamma_A = \gamma_{AB}$ and $\gamma_B = \gamma_{AB}$ are necessary and sufficient conditions to guarantee overlap of $E_A$ and $E_B$ if the gating criterion is satisfied. It should also be noted that since any $\gamma_A$ or $\gamma_B$ greater than $\gamma_{AB}$ is also sufficient, the condition $\gamma_A = \gamma_B = \gamma_{AB}$ is the minimum and therefore optimal criterion, resulting in the minimum number of possible tests for gate satisfaction. (Satisfaction of the gating criterion implies overlap but the reverse implication is not necessarily true and the probability overlap integrals corresponding to each overlapping pair of ellipsoids must be evaluated and compared to $\gamma_{AB}$).

As a final note, we point out that since $$(a-b)_i \leq \sqrt{\gamma_{AB} A_{ii}} \quad (22)$$

cannot be guaranteed in general, one cannot assume that any arbitrary finite gate chosen for one of the two sets will always determine ellipsoids that overlap the mean position of associated elements from the other set. This implies that without particular knowledge of the datasets a volumetric intersection approach is the only way to guarantee finding all associations that satisfy the gating criterion.

For determining the intersection of two volumes efficient methods rely on comparisons of common reference coordinate values that bound a hyper-rectangular volume. These bounding coordinate values define circumscribing, coordinate aligned (isothetic) boxes or d-ranges in d-dimensions for each ellipsoid. A box oriented along the rectangular coordinate axes that circumscribes a d-ellipsoid described by the expression $(a-r)^T A^{-1}(a-r) = \gamma$ is determined by tangent hyperplanes defined by $$p_k = \alpha_k \pm \sqrt{\gamma A_{kk}} \quad (23)$$

Overlapping box pairs are cheaply determined and for each of the overlapping box pairs a probability of association is calculated and thresholded.

Circumscribing error ellipsoids with multidimensional ranges permits the application of efficient search algorithms (see: J. L. Bently et al., An Optimal Worst Case Algorithm for Reporting Intersections of Rectangles, IEEE TRANSACTIONS OF COMPUTERS, Vol. C-29, pp. 471–77; July 1980; B. Chazelle, A Functional Approach to Data Structures and its Use in Multidimensional Searching, Siam J. Comput., Vol 17, No. 3, pp. 427–62, June 1988) called multidimensional search trees. In our implementation of a multidimensional tree search-structure the set of d-dimensional boxes is divided (roughly) in half at each node of a ternary tree on one of the d coordinates. At each node the set is partitioned into a set of boxes which lie entirely to the left of the partitioning hyperplane, a set of boxes which lie entirely to the right of the partitioning hyperplane and a set of boxes which are intersected by the partitioning hyperplane, cycling through the coordinates for partitioning at progressively deeper nodes. The method for searching the tree then simply involves the determination of which set the search box would be assigned according to the partitioning hyperplane at each node. For example, if the search box lies entirely to the left of the partitioning hyperplane, then the sub-tree of boxes which lie entirely to the right of it can be ignored. Similarly, if the search box lies entirely to the right of the partitioning hyperplane, then the sub-tree of boxes which lie entirely to the left of it can be ignored. Only in the case where the partitioning hyperplane intersects the search box must all sub-trees be examined. (Note that the set of boxes intersected by the partitioning hyperplane represent a sub-problem of reduced dimensionality.) The depth of the tree is roughly $\log_2 N$, where N is the number of d-ranges in the tree. In the worst case a single search may require $N^{1-1/d} + k$ comparisons (where k is the average number of elements intersecting the search volume and d is the dimensionality of the data).

Tests were performed on datasets ranging in size from 1K to 64K, and for data dimensions d=3 and d=8 (see figures). The mean positions of the boxes as well as their individual coordinate ranges were drawn independently from uniform distributions such that the average number of intersections per search query remained constant (five) independent of dataset size. Additional tests confirmed that the algorithm is relatively insensitive to the distribution of the mean positions; specifically, tests were performed using clustered and anisotropic distributions and similar results were obtained. These tests were carried out on a SUN4 architecture with an instruction rate of about sixteen MIPs. In our test cases for three and eight dimensions average scaling performance was consistent with a poly-log linear scaling, $N(\log_2 N)^3$ for three dimensions and $N(\log_2 N)^4$ for eight dimensions. We also note that the scaling performance was also consistent with a power-law scaling, $N^{1.3}$ for three dimensions and $N^{1.47}$ for eight dimensions. It appears that these two interpretations are numerically indistinguishable.

This efficient gating may be done by only evaluating the association probabilities of those distributed state pairs whose coordinate aligned circumscribing boxes, or d-ranges, overlap. This is a result of the geometric properties of the space of Gaussian-distributed, independent random variables. The boxes are simply determined from the data vector, a, its covariance matrix, A, and the gating criterion, $\gamma$, to be defined by the set of hyperplanes $$p_k = \alpha_k \pm \sqrt{\gamma A_{kk}} \{k: k=1, \ldots, d\} \quad (24)$$

The efficient determination of overlaps between boxes can be done with a search tree algorithm. In our test cases average scaling performance was consistent with a poly-log linear scaling (indistinguishable from some power-law significantly less than 2) for the total association evaluation task, where N is the size of the data set. The variability of scaling appeared to vary only with the dimensionality of the data.

The efficiency of this method is twofold: the overall scaling of the gating process is reduced by use of a multidimensional tree based search algorithm, and; the ellipsoidal volumes defined for each distributed state are the minimal volumes that can be so defined, minimizing the number of computationally expensive evaluations of the association probability.

For few dimensions, using box intersections appears the most efficient method for determining ellipsoid intersections. As the dimensionality increases it may be worthwhile to investigate more sophisticated approaches to determining ellipsoid intersection other than testing ellipsoid pairs with intersecting d-ranges. (This difficulty arises from the fact that ellipsoids ($L_2$ spheres) indicate distances calculated with a Euclidean norm and d-ranges ($L_\infty$ spheres) imply distances calculated with an $L_\infty$ vector space norm).

While we have defined minimal volumes for gating of distributed states defined around a point, many tasks are defined for states distributed around such objects as a trajectory segment defined by a particular time period. One might define a suitable heuristic as follows: keeping in mind the minimal ellipsoidal volume of the distributed state at any particular point in time, the whole trajectory segment might either be circumscribed by a single box or represented by a chain of boxes. Once the objects are all decomposed into boxes gating as outlined above may proceed.

FIG. 1 illustrates a situation in which one can use the invention. Platform 10, such as a stationary ship, has radar 20 which scans a plurality 30 of hostile missiles approaching ship 10 radially from the same direction. Each radar return informs ship 10 of the radial distance of each object 30 at the time of the return. Each radar pulse provides ship 10 with a return from each object (missile) 30, from which ship 10 can determine radial distance of each object 30 by conventional techniques. (Ship 10 could, of course, use conventional techniques to determine any of a number of other parameters about objects 30, such as doppler shift and velocity, acceleration, temperature, luminescence, or any other relevant and measurable parameter. Furthermore, object 30 need not approach ship 10 radially for practice of the invention. These simplifications are made to simplify this example, most particularly to draw an example in which d=2, a condition more easily visualized than the hyperspace of d≧3.)

Thus, with each pulse ship 10 can record the radial distance for each object 30 at a specific time. This forms a data set comprised of two dimensional data vectors in which one element is radial position, the other time. For effective tracking, ship 10 wishes to know which of the data vectors resulting from different radar pulses correspond to the same object 30.

Let the data vectors returned from one pulse be called $\{\alpha\}$, having members $a\epsilon\{\alpha\}$ and the set of data vectors returned from another pulse be $\{\beta\}$, having members $b\epsilon\{\beta\}$. The radar cannot measure either time or distance perfectly, so the elements of each a and b have uncertainties which are considered to be Gaussian distributed. Thus associated with each vector a and b of $\{\alpha\}$ and $\{\beta\}$ is a corresponding covariance matrix A or B, and thus each $\{a,A\}$, $\{b,B\}$ forms a distributed state as defined above.

Figure 2:
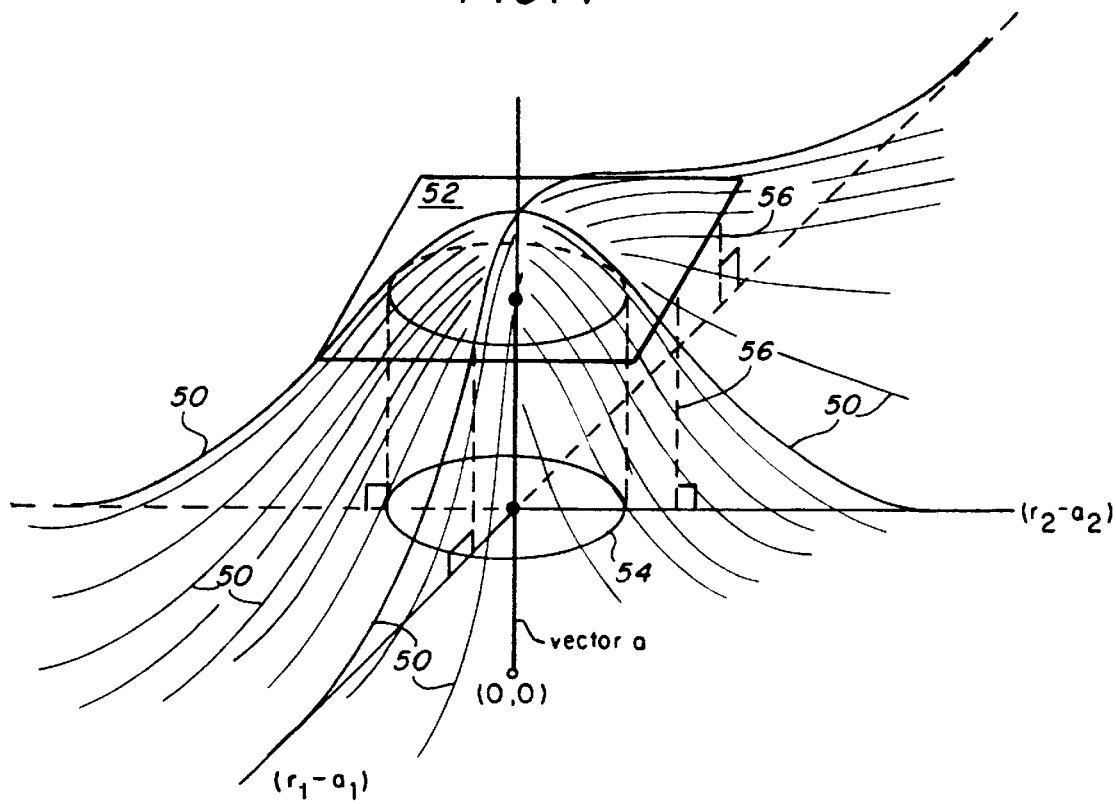
FIG. 2 shows a physical interpretation of the gating criterion for d=2.

FIG. 2 shows the probability density function 50 that one vector $a\epsilon\{\alpha\}$ was measured accurately. The contour 50 is a function of each point r in the plane formed by orthogonal direction $r_1$, $r_2$ (which, in this example, corresponds to radial position and time, respectively). The point (0,0) in $r_1,r_2$ indicates an arbitrary origin (e.g. the time of the first pulse, and zero radial distance from ship 10), and contour 50 is centered about the vector a in $r_1,r_2$. (The axis notation $r_1-a_1$, and $r_2-a_2$ merely indicate that these axes are linearly shifted in the $r_1,r_2$ plane to point a, i.e. a is the mean value of the distributed state $\{a,A\}$.

Note also that contour 50 is Gaussian, but the spread of the distribution is different in the $r_1$ and $r_2$ direction. This is because the uncertainty in $r_1$ and $r_2$ (radial position and time in this example) are not identical.

The most direct way for ship 20 to determine which members of $\{60\}$ correspond to which members of $\{\beta\}$ would be to perform the association integral for each vector pair between $\{\alpha\}$ and $\{\beta\}$. However, it is more efficient to eliminate pairs which have little likelihood of correspondence to one another, i.e. which are far from one another in state space $r_1,r_2$. One can do this by selecting for each data vector an arbitrary magnitude based upon specific error rates required by the specific application at hand (gating criterion) of contour 50, by cutting contour 50 at this magnitude by a plane 52 parallel to plane $r_1,r_2$, and projecting the intersection contour 50 and plane 52 onto the $r_1,r_2$ plane. This projection 54 is an ellipse (for d≧3, an ellipsoid; for purposes of this invention, the term "ellipsoid" comprehends "ellipse"). Upon doing this for all vectors in $\{\alpha\}$ and $\{\beta\}$, one can ignore all vector pairs a,b whose associated ellipses do not overlap. Thereafter, ship 10 can use any conventional method (e.g. evaluating the association integral) to further evaluate which vectors in $\{\alpha\}$ correspond to which in $\{\beta\}$. by eliminating vector pairs which do not meet the gating criterion, one materially reduces the number of data pairs one must consider.

By varying the height 56 of plane 52 above the $r_1,r_2$ plane, one makes the projected ellipse correspondingly larger or smaller. thus by a judicious placement of plane 56, one can guarantee overlap of ellipses corresponding to any two data vectors one wishes. Varying this height is the same as varying the values of $\gamma_A$, $\gamma_B$, $\gamma_{AB}$, etc., as discussed above. The necessary and sufficient conditions for such $\gamma$'s to ensure overlap are presented above. For example, if one knows a priori that two data vectors $a_1$ and $b_1$ do in fact correspond to the same object, one can then calculate an optimal gating condition $\gamma_{A1}=\gamma_{B1}=\gamma_{A1B1}$ (the corresponding ellipses intersect at at least one point), and use this as the gating criterion for other data pairs a,b.

For those data pairs which do meet the gating criterion, ship 10 applies conventional techniques for testing associations between data vector tracks. These techniques could include evaluation the association integral or any other association/correlation measure for each data pair.

The invention has been described in what is considered to be the most practical and preferred embodiments. It is recognized, however, that obvious modifications may occur to those with skill in this art. Accordingly, the scope of the invention is to be discerned solely by reference to the appended claims, wherein:

What is claimed is:

1. A method of correlating a plurality of objects comprising:

scanning said plurality of objects;

producing at a first time a set $\{\alpha\}$ of d dimensional data vectors, each of whose members $a\epsilon\{\alpha\}$ corresponds to a corresponding one of said plurality of objects, each element of each of said members a corresponding to a physical property of said corresponding one of said plurality of objects at said first time;

producing at a second time a second set $\{\beta\}$ of d dimensional data vectors, each of whose members $b\epsilon\{\beta\}$ corresponds to one of said plurality of objects, each element of each of said members b corresponding to a physical property of said corresponding one of said plurality of objects at said second time;

wherein the uncertainty if each element if each said data vector a or b is Gaussian and thus has respective covariance matrices A and B;

selecting a numerical value $\gamma_{AB}$;

determining which vector pairs a, b satisfy the gating criterion:

$\gamma_A \geq \gamma_{AB}$, and $\gamma_B \geq \gamma_{AB}$, where $$\gamma_A = (r-a)^T A^{-1}(r-a)$$

$$\gamma_B = (r-b)^T B^{-1}(r-b)$$

$$\gamma_{AB} = (a-b)^T (A+B)^{-1}(a-b)$$

where r is some d dimensional vector;

selecting a relatedness criterion for determining the degree of association between any such vector pair a,b;

for all said vector pairs which satisfy said gating criterion, applying said relatedness criterion;

using the results of said applying of said relatedness criterion to fuse the data vectors of sets $\{\alpha\}$ and $\{\beta\}$ into a fused set $\{c\}$ of data vectors each of whose members corresponds to one of said objects.

2. The method of claim 1, further comprising outputting an electronic signal corresponding to each member of $\{C\}$.

3. The method of claim 2, wherein said applying said relatedness criterion comprises:

for each said vector pair a,b, determining a pair of d dimensional rectangles, one of whose sides are all tangent to the ellipsoidal contour defined by $(r-a)^T A^{-1} (r-a) = \gamma_A$, the other of whose sides are all tangent to the ellipsoidal contour defined by $(r-b)^T B^{-1} (r-b) = \gamma_B$.

4. The method of claim 1, wherein said applying said relatedness criterion comprises:

for each said vector pair a,b, determining a pair of d dimensional rectangles, one of whose sides are all tangent to the ellipsoidal contour defined by $(r-a)^T A^{-1} (r-a) = \gamma_A$, the other of whose sides are all tangent to the ellipsoidal contour defined by $(r-b)^T B^{-1} (r-b) = \gamma_B$.

5. An apparatus for correlating a plurality of objects comprising:

means for scanning said plurality of objects;

means for producing at a first time a set $\{\alpha\}$ of d dimensional data vectors, each of whose members $a \in \{\alpha\}$ corresponds to one of said plurality of objects, each element of each of said members a corresponding to a physical property of said corresponding one of said plurality of objects at said first time;

means for producing at a second time a second set $\{\beta\}$ of d dimensional data vectors, each of whose members $b \in \{\beta\}$ corresponds to one of said plurality of objects, each element of each of said members a corresponding to a physical property of said corresponding one of said plurality of objects at said first time;

wherein the uncertainty of each element of each said data vector a or b is Gaussian, each data vector a and b thus has respective covariance matrices A and B;

means for selecting a numerical value $\gamma_{AB}$;

means for determining which vector pairs a, b satisfy the gating criterion:

$\gamma_A \geq \gamma_{AB}$, and $\gamma_B \geq \gamma_{AB}$, where $\gamma_A = (r-a)^T A^{-1} (r-a)$ $\gamma_B = (r-b)^T B^{-1} (r-b)$ $\gamma_{AB} = (a-b)^T (A+B)^{-1} (a-b)$ where r is any d dimensional vector;

means for selecting a relatedness criterion for determining the degree of association between any such vector pair a,b;

means for applying said relatedness criterion to all said vector pairs which satisfy said gating criterion;

means for using the results produced by said means for applying said relatedness criterion to fuse the data vectors of sets $\{\alpha\}$ and $\{\beta\}$ into a fused set $\{c\}$ of data vectors each of whose members corresponds to one of said objects.

6. The apparatus of claim 5, wherein said means for applying said relatedness criterion comprises:

for each said vector pair a,b, means for determining a pair of d dimensional rectangles, one of whose sides are all tangent to the ellipsoidal contour defined by $(r-a)^T A^{-1} (r-a) = \gamma_A$, the other of whose sides are all tangent to the ellipsoidal contour defined by: $(r-b)^T B^{-1} (r-b) = \gamma_B$.

7. The apparatus of claim 5, further comprising means for outputting an electronic signal corresponding to each member of $\{C\}$.

8. The apparatus of claim 7, wherein said means for applying said relatedness criterion comprises:

for each said vector pair a,b, means for determining a pair of d dimensional rectangles, one of whose sides are all tangent to the ellipsoidal contour defined by $(r-a)^T A^{-1} (r-a) = \gamma_A$, the other of whose sides are all tangent to the ellipsoidal contour defined by: $(r-b)^T B^{-1} (r-b) = \gamma_B$.

9. The apparatus of claim 5, wherein said elements of a are each numerical measures of a physical parameter of the corresponding one of said plurality of said objects.

10. A method of correlating a plurality of objects comprising:

scanning said plurality of objects;

forming at a first time a set $\{\alpha\}$ of d dimensional data vectors a, $a \in \{\alpha\}$, each of said vectors a corresponding to a respective one of said plurality of objects, each element of said each of said vectors a representing the magnitude of a physical property of said respective one of said objects at said first time;

forming at a second time a set $\{\beta\}$ of d dimensional data vectors b, $b \in \{\beta\}$, each of said vectors b corresponding to a respective one of said plurality of objects, each element of said each of said vectors b representing the magnitude of a physical property of said respective one of said objects at said second time;

wherein the uncertainty of each element of each said data vector a or b is Gaussian and thus has respective covariance matrices A and B;

selecting a numerical value $\gamma_{AB}$;

determining which vector pairs a, b satisfy the gating criterion:

$\gamma_A \geq \gamma_{AB}$, and $\gamma_B \geq \gamma_{AB}$, where $\gamma_A = (r-a)^T A^{-1} (r-a)$ $\gamma_B = (r-b)^T B^{-1} (r-b)$ $\gamma_{AB} = (a-b)^T (A+B)^{-1} (a-b)$ where r is some d dimensional vector;

selecting a relatedness criterion for determining the degree of association between any such vector pair a,b;

for all said vector pairs which satisfy said gating criterion, applying said relatedness criterion;

using the results of said applying of said relatedness criterion to fuse the data vectors of sets $\{\alpha\}$ and $\{\beta\}$ into a fused set $\{c\}$ of data vectors each of whose members corresponds to one of said objects.

11. An apparatus for correlating a plurality of objects comprising:

means for scanning said plurality of objects;

means for forming at a first time a set $\{\alpha\}$ of d dimensional data vectors a, $a \in \{\alpha\}$, each of said vectors a corresponding to a respective one of said plurality of objects, each element of said each of said vectors a representing the magnitude of a Physical property of said respective one of said objects at said first time;

means for forming at a second time a set $\{\beta\}$ of d dimensional data vectors b, $b \in \{\beta\}$, each of said vectors b corresponding to a respective one of said plurality of objects, each element of said each of said vectors b representing the magnitude of a physical property of said respective one of said objects at said second time;

wherein the uncertainty of each element of each said data vector a or b is Gaussian, each data vector a and b thus has respective covariance matrices A and B;

means for selecting a numerical value $\gamma_{AB}$;

means for determining which vector pairs a, b satisfy the gating criterion:

$\gamma_A \geq \gamma_{AB}$, and $\gamma_{AB} \geq \gamma_{AB}$, where $$\gamma_A = (r-a)^T A^{-1} (r-a)$$

$$\gamma_B = (r-b)^T B^{-1} (r-b)$$

$$\gamma_{AB} = (a-b)^T (A+B)^{-1} (a-b)$$

where r is any d dimensional vector;

means for selecting a relatedness criterion for determining the degree of association between any such vector pair a,b;

means for applying said relatedness criterion to all said vector pairs which satisfy said gating criterion;

means for using the results produced by said means for applying said relatedness criterion to fuse the data vectors of sets $\{\alpha\}$ and $\{\beta\}$ into a fused set $\{c\}$ of data vectors each of whose members corresponds to one of said objects.

* * * * *